(12) United States Patent
Jin et al.

(10) Patent No.: US 7,053,602 B2
(45) Date of Patent: May 30, 2006

(54) ROTATION SENSOR AND METHOD FOR DETECTING A ROTATION ANGLE OF A ROTATING MEMBER

(75) Inventors: Dongzhi Jin, Tokyo (JP); Fumihiko Abe, Tokyo (JP)

(73) Assignee: The Furukawa Electric Co., Limited, Tokyo (JP)

( * ) Notice: Subject to any disclaimer, the term of this patent is extended or adjusted under 35 U.S.C. 154(b) by 224 days.

(21) Appl. No.: 10/674,571

(22) Filed: Sep. 30, 2003

(65) Prior Publication Data

US 2004/0085063 A1    May 6, 2004

(51) Int. Cl.
G01R 33/02 (2006.01)
G01B 7/14 (2006.01)
G01B 7/30 (2006.01)

(52) U.S. Cl. ............... 324/207.16; 324/207.25
(58) Field of Classification Search ........... 324/207.16, 324/207.25, 207.21, 207.22; 73/862.331
See application file for complete search history.

(56) References Cited

U.S. PATENT DOCUMENTS

| 2,498,282 A | 2/1950 | Langer |
| 3,890,515 A | 6/1975 | Fehr et al. |
| 4,112,365 A | 9/1978 | Larson et al. |
| 4,356,732 A | 11/1982 | Hachtel et al. |
| 4,680,976 A | 7/1987 | Lustenberger |
| 4,881,414 A | 11/1989 | Setaka et al. |
| 4,906,924 A | 3/1990 | Zannis |
| 5,083,468 A | 1/1992 | Dobler et al. |
| 5,195,382 A | 3/1993 | Peilloud |
| 5,394,760 A | 3/1995 | Persson et al. |
| 5,578,767 A | 11/1996 | Chikaraishi et al. |
| 5,637,997 A | 6/1997 | Hore et al. |
| 5,796,014 A | 8/1998 | Chikaraishi et al. |
| 6,481,296 B1 | 11/2002 | Jin et al. |
| 6,532,831 B1 | 3/2003 | Jin et al. |
| 2004/0050180 A1 | 3/2004 | Abe et al. |

FOREIGN PATENT DOCUMENTS

JP    2001-099680    4/2001

OTHER PUBLICATIONS

English translation of JP 2002-83535 (filing date Mar. 25, 2002) pp. 1-19.*

* cited by examiner

*Primary Examiner*—Bot Ledynh
*Assistant Examiner*—Reena Aurora
(74) *Attorney, Agent, or Firm*—Cohen, Pontani, Lieberman & Pavane

(57) ABSTRACT

A rotation sensor includes a rotor rotatable together with an automotive steering shaft, a conductive band formed on the rotor, a magnetic coil/core unit fixed near the rotor, the unit having a core body and an exciting coil, and a rotation angle detection circuit electrically connected to the coil. The width of the band gradually increases along a half-circumference of the rotor and then gradually decreases along the remaining half-circumference of the rotor, as viewed in the rotating direction of the rotor. The detection circuit applies an alternating signal to the coil. As the rotor is rotated with the alternating signal applied to the coil, the band causes the impedance of the coil to change in accordance with the rotation angle of the rotor, and based on the impedance change, the detection circuit detects the rotation angle of the rotor, that is, the steering shaft.

20 Claims, 14 Drawing Sheets

ROTATION SENSOR AND METHOD FOR DETECTING A ROTATION ANGLE OF A ROTATING MEMBER

BACKGROUND OF THE INVENTION

1. Field of the Invention

The present invention relates to a rotation sensor and method for detecting the angle of rotation of a rotating member such as a steering shaft of a motor vehicle, for example.

2. Description of the Related Art

A steering system of a motor vehicle includes a rotation sensor for detecting the rotation angle of a steering wheel, that is, a steering shaft, and an example of rotation sensor is disclosed in Unexamined Japanese Patent Publication No. 2001-099680, for example.

The rotation sensor disclosed in this publication is used for measuring rotational torque of the steering shaft. More specifically, the steering shaft has an upper shaft portion coupled to the steering wheel, a lower shaft portion connected to a steering gear unit, and a torsion bar coupling the shaft portions to each other. The rotation sensor detects an angle of relative rotation, or relative angular displacement, between the upper and lower shaft portions by using electromagnetic induction technique, and based on the detected relative rotation angle, the rotational torque of the steering shaft is measured. The measured torque is used to determine an assisting force which is to be generated by the power steering system.

This type of rotation sensor can be used not only to detect the relative rotation angle as mentioned above but also to detect the angle of rotation of the steering shaft. Such a rotation sensor basically includes a rotor mounted to the steering shaft, a stator surrounding the rotor, an exciting coil contained in the stator for forming a magnetic circuit between the stator and the rotor, and metal layers formed on an outer peripheral surface of the rotor at regular intervals in a circumferential direction thereof for cutting across part of the magnetic flux of the magnetic circuit.

Thus, the rotor and the stator are arranged around the steering shaft concentrically with each other, so that the rotation sensor is inevitably increased in diameter.

Also, since the rotor has the multiple metal layers distributively formed thereon, the rotor structure is complicated. Moreover, each of the metal layers needs to have a predetermined length or more in the axial direction of the steering shaft, making it impossible to reduce the axial thickness of the rotation sensor.

Further, the rotation angle of the steering shaft cannot be accurately detected.

An object of the present invention is therefore to provide a rotation sensor which is simple in structure and reduced in size and yet is capable of accurately detecting the rotation angle of a rotating member and a method of detecting the rotation angle of the rotating member.

SUMMARY OF THE INVENTION

The above object is achieved by a rotation sensor of the present invention. The rotation sensor comprises: a rotor mounted to a rotating member for rotation together therewith, the rotor having an annular element; a magnetic coil/core unit arranged opposite to the annular element and fixed to a fixing member, the magnetic coil/core unit including a core body, and an exciting coil for carrying an AC current and forming a magnetic circuit, wherein the annular element having a width varying along the circumferential direction of the rotor such that when the rotor is rotated, the annular element causes impedance of the exciting coil to change in accordance with a rotation angle of the rotor; and a detection device electrically connected to the exciting coil, for measuring a rotation angle of the rotating member based on change in the impedance of the exciting coil.

In this rotation sensor, the rotor may be disc-shaped and the annular element continuously extends in the circumferential direction of the rotor. It is therefore possible to reduce the thickness of the rotation sensor in the axial direction of the rotating member, thus permitting reduction in size of the rotation sensor. Also, the annular element can be easily provided on the rotor, and accordingly, the rotation sensor can be simplified in structure and be provided at low cost.

Further, as the rotor rotates, the impedance of the exciting coil of the magnetic coil/core unit continuously changes, whereby the rotation angle of the rotor, and thus the rotation angle of the rotating member, can be measured with high accuracy.

The above object can also be achieved by a method according to the present invention. The method comprises the steps of: arranging a magnetic coil/core unit near a rotor rotatable together with a rotating member, the magnetic coil/core unit having a core body, and an exciting coil for carrying AC current and forming a magnetic circuit, the rotor having an annular element whose width varies along a circumferential direction of the rotor, the annular element causing impedance of the exciting coil to change in accordance with a rotation angle of the rotor; and measuring a rotation angle of the rotating member, based on change in the impedance of the exciting coil.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
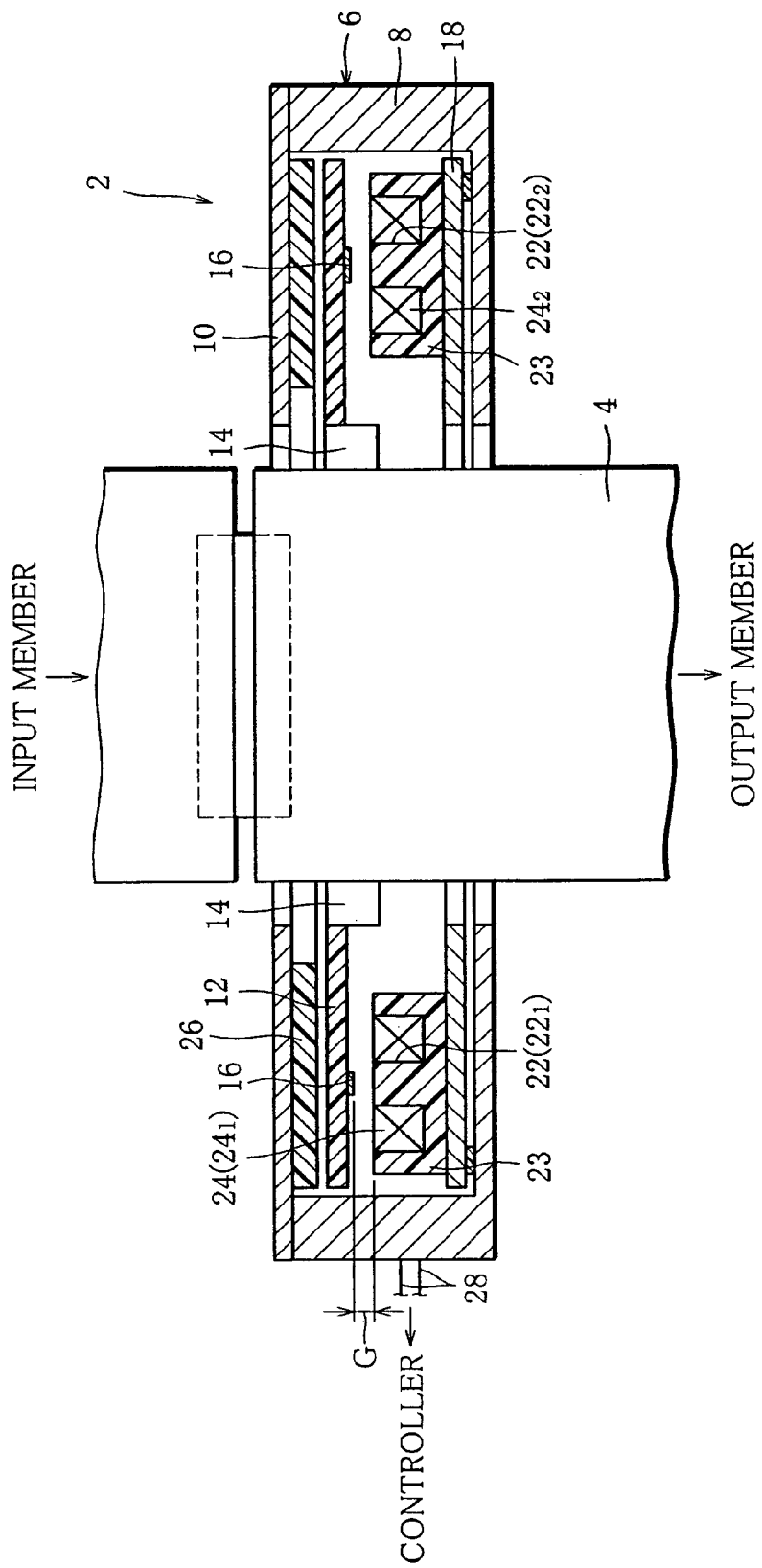
FIG. 1 is a schematic sectional view of a rotation sensor according to one embodiment of the present invention.

Referring first to FIG. 1, a rotation sensor 2 is mounted to a rotary shaft 4. The rotary shaft 4 connects input and output members to each other and transmits a rotation angle input to the input member to the output member.

The rotation sensor 2 has a cylindrical casing 6. The casing 6 surrounds the rotary shaft 4 and is fixed to a mounting bracket (not shown) arranged outside the shaft 4. More specifically, the casing 6 has a circular shell 8 opening wide at an upper end thereof, as viewed in FIG. 1, and an end plate 10 fitted in the opening of the shell 8. The shell 8 and the end plate 10 are made of, for example, an electrically conductive metal (material capable of shutting off magnetic field) such as aluminum or copper, or a material having electrical insulating property.

A disc-shaped rotor 12 is arranged inside the casing 6. The rotor 12 is connected to the rotary shaft 4 by means of a plurality of dampers 14 and rotates, together with the rotary shaft 4, inside the casing 6. The dampers 14, which are four in number, are arranged at regular intervals in the circumferential direction of the rotary shaft 4 and serve to restrain diametrical oscillations of the rotor 12.

The rotor 12 may be made of various materials, such as electrically conductive material, magnetic material having electrical insulating property, electrically insulating material, or non-magnetic metallic material having electrical conductivity.

Specifically, the electrically conductive material to be used includes metals such as aluminum, copper, silver and iron, and synthetic resins containing conductive carbon or carbon fibers. The magnetic material having electrical insulating property may be a mixture of Ni—Zn or Mn—Zn or Mg—Zn ferrite particles and 10 to 70 volume % of thermoplastic synthetic resin, and in this case, the thermoplastic synthetic resin needs to have electrical insulating property and is selected from nylon, polypropylene (PP), polyphenylene sulfide (PPS), ABS resins, etc. The electrically insulating material includes synthetic resins such as nylon, polyphenylene sulfide (PPS) and ABS resins, FRP (fiber-reinforced plastics) having glass fibers impregnated with epoxy resin, ceramics, etc. The non-magnetic metallic material includes aluminum, copper, etc.

The rotor 12 has an annular element or band 16, as an object to be detected, formed on a lower surface thereof. As clearly shown in FIG. 2, the band 16 is in the form of a ring extending along the entire circumference of the rotor 12 and has a width W gradually increasing from position $P_1$ toward position $P_2$. The positions $P_1$ and $P_2$ are separated from each other in a diametrical direction of the rotor 12, and the width W has a minimum value at the position $P_1$ and a maximum value at the position $P_2$. Namely, the width W of the band 16 proportionally increases with increase in the angle of rotation of the rotor 12 from the position $P_1$ to the position $P_2$ as viewed in the circumferential direction of the rotor 12.

The band 16 may be made of any of the aforementioned materials including the electrically conductive material, magnetic material having electrical insulating property, electrically insulating material and non-magnetic metallic material having electrical conductivity. However, the band 16 and the rotor 12 are made of different materials.

In this embodiment, the rotor 12 is made of insulating material while the band 16 is made of conductive material. This combination of materials is advantageous in that the rotation sensor 2 can be reduced in thickness and can be provided at low cost.

As shown in FIG. 1, a disc-shaped measurement substrate 18 is also contained in the casing 6. The measurement substrate 18 faces the lower surface of the rotor 12 and is placed on the bottom of the casing 6 with a ring-like spacer 20 therebetween. The spacer 20 has electrical insulating property. Instead of using the spacer 20, an insulating layer such as an electrically insulating sheet may be interposed between the measurement substrate 18 and the bottom of the casing 6.

At least one core 22 is arranged on the upper surface of the measurement substrate 18. The core 22 is made of magnetic material having electrical insulating property and is positioned right under the rotor 12, or more specifically, the band 16. A gap of several millimeters is secured between the band 16 of the rotor 12 and the core 22.

The core 22 has a diameter larger than the maximum value of the width of the band 16. The core 22 further includes a surrounding yoke 23 integrally formed with the core 22 so as to define an annular hole between the core 22 and the surrounding yoke 23. An exciting coil 24 is received in the annular hole and constitutes a magnetic coil/core unit in cooperation with the core 22 and the surrounding yoke. Thus, the core 22 and the surrounding yoke 23 forms a part of the magnetic circuit allowing the magnetic field produced by the exciting coil 24 to pass through them when the coil 24 is excited.

More specifically, when the rotary shaft 4, that is, the rotor 12, is in a neutral position in terms of rotation angle of the rotary shaft 4, the magnetic coil/core unit, that is, the core 22, is positioned directly under the position P, of the rotor 12.

The exciting coil 24 is electrically connected to a rotation angle detection circuit mounted on the measurement substrate 18. The rotation angle detection circuit supplies an alternating current or an alternating excitation signal to the exciting coil 24 thereby to cause the exciting coil 24 to generate an alternating magnetic field.

Further, a disk-like yoke plate 26 of magnetic material is contained in the casing 6. The yoke plate 26 is fixed to the end plate 10 of the casing 6 and faces the magnetic coil/core unit (core 22 and exciting coil 24) with the rotor 12 therebetween.

Figure 3:
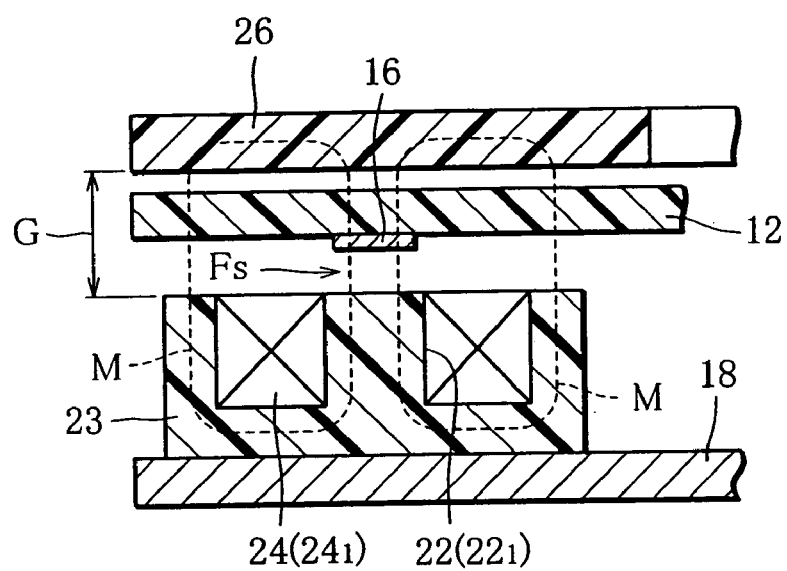
FIG. 3 is an enlarged view showing part of the rotation sensor of FIG. 1.

As shown in FIG. 3, the alternating magnetic field generated by the exciting coil 24, therefore, creates the magnetic circuit M between the magnetic coil/core unit and the yoke plate 26. More specifically, the central magnetic flux $F_s$, which extends from the end face of the core 22 toward the yoke plate 26, passes through the rotor 12, that is, the band 16 formed thereon.

As the magnetic flux $F_s$ relatively crosses the band 16 of the rotor 12, eddy current is produced on the band 16. The eddy current has an intensity corresponding to the width W or the effective area of that portion of the band 16 which is located right above the core 22 and is passed through by the central magnetic flux $F_s$. Such a eddy current induces alternating magnetic field, and the thus-induced alternating magnetic field changes the impedance of the exciting coil 24.

As shown in FIG. 1, electric wires 28 extend from the rotation angle detection circuit mounted on the measurement substrate 18. The electric wires 28 are electrically connected, through a wire harness, to a controller including a power supply circuit.

Figure 4:
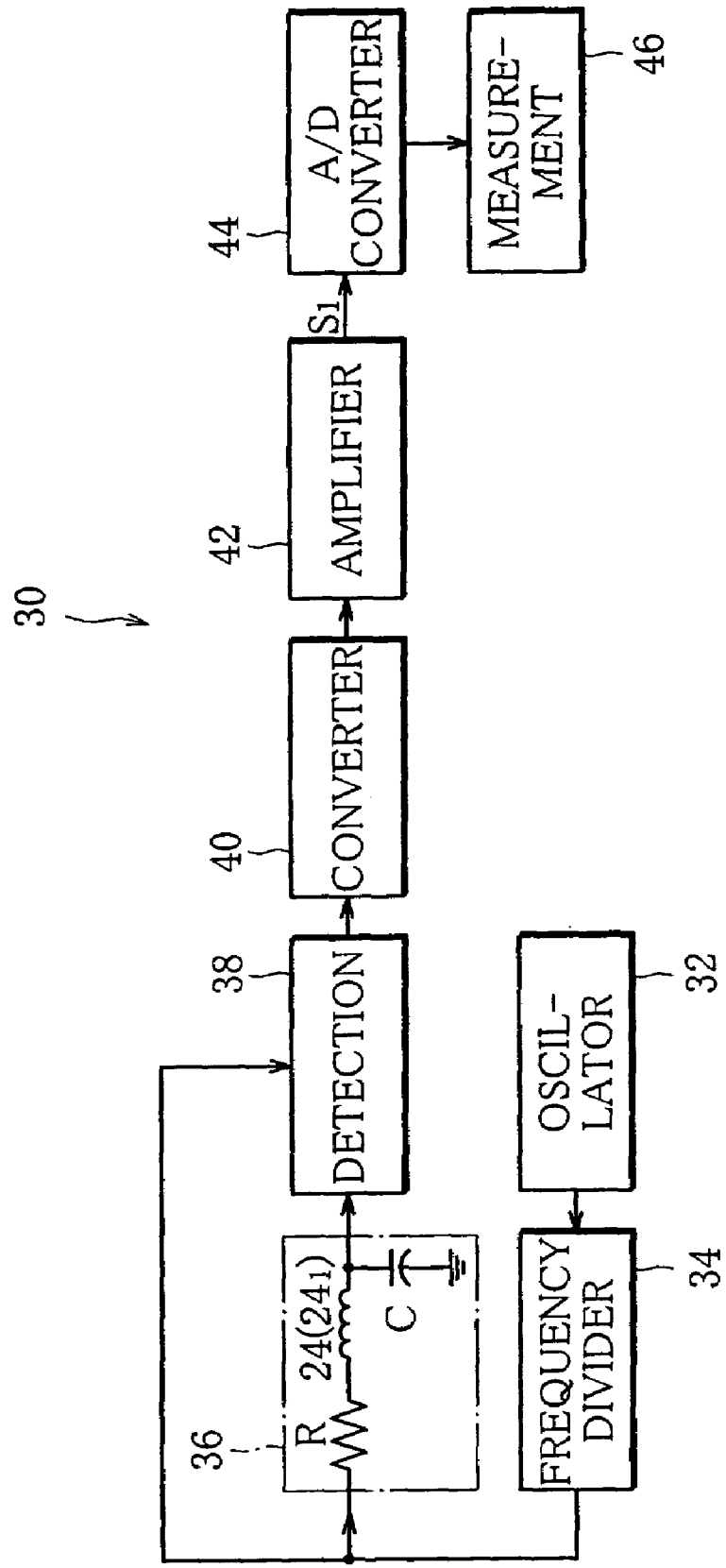
FIG. 4 is a block diagram of a rotation angle detection circuit mounted on a measurement substrate shown in FIG. 1.

FIG. 4 shows the rotation angle detection circuit 30. The detection circuit 30 includes an oscillator 32 for generating an AC current or a pulse signal having a predetermined frequency. The generated pule signal is turned into an alternating signal (the alternating excitation signal) with a specific frequency by means of a frequency divider 34, and the resulting specific alternating signal is applied to a shifting section 36.

The shifting section 36 includes a resonance circuit having a resistor R, the exciting coil 24 and a capacitor C. As the impedance of the exciting coil 24 changes with rotation of the rotor 12 as mentioned above, the phase of an alternating voltage developed across the capacitor C is shifted with respect to the phase of the specific alternating signal in accordance with change in the impedance of the exciting coil 24. Namely, the shifting section 36 delivers a shifted alternating signal of which the phase is shifted from the phase of the specific alternating signal in accordance with change in the impedance of the exciting coil 24.

The frequency divider 34 and the shifting section 36 are connected to a detection section 38, respectively. The detection section 38 detects an amount of phase shift between the specific alternating signal from the divider 34 and the shifted alternating signal from the section 36, and supplies the result of detection to a converter 40. The converter 40 converts the phase shift amount to a voltage signal, which is then amplified by an amplifier 42 and supplied, via an A/D converter 44, to a measurement section 46.

The measurement section 46 is constituted, for example, by a microprocessor and peripheral circuitry thereof, and measures the angle of rotation of the rotor 12 and thus the rotary shaft 4, based on the voltage signal supplied from the amplifier 42.

To explain this in more detail, the width W or the effective area of the band 16 of the rotor 12 gradually increases from the position $P_1$ toward the position $P_2$, and thus the intensity of the eddy current induced on the band 16, that is, the impedance of the exciting coil 24, proportionally changes with increase in the angle of rotation of the rotor 12 from the neutral position. Accordingly, based on the voltage signal indicative of the amount of change in the impedance of the exciting coil 24, the measurement section 46 can measure the rotation angle of the rotor 12.

Figure 5:
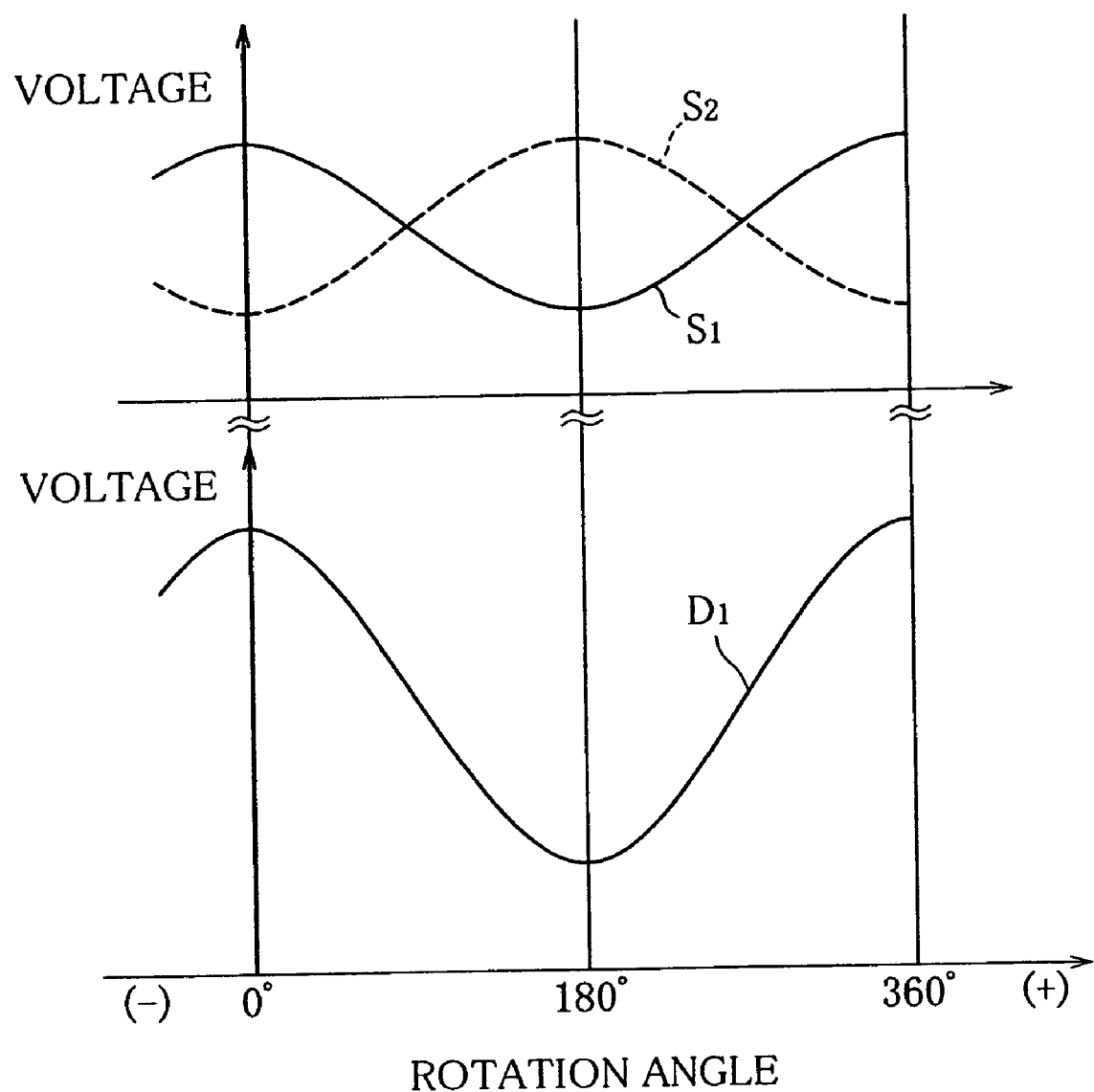
FIG. 5 is a graph showing output to a measurement section appearing in FIG. 4.

In FIG. 5, the voltage signal $S_1$ output from the amplifier 42 is indicated by the solid line. Also, in FIG. 5, the neutral position (position $P_1$) of the rotor 12 corresponds to a rotation angle of 0°, right-handed or clockwise rotation of the rotor 12 is indicated by positive (+) rotation angle, and counterclockwise rotation of same is indicated by negative (−) rotation angle. As seen from the figure, the measurement section 46 can detect the rotation angle of the rotor 12, that is, the rotary shaft 4, based on the voltage signal $S_1$.

Specifically, the measurement section 46 outputs the detected rotation angle in the form of a pulse signal. The pulse signal is generated at regular intervals and a duty factor thereof indicates the rotation angle of the rotor 12.

As is clear from FIG. 5, the voltage signal $S_1$ linearly varies when the rotation angle of the rotor 12 is within the range of 45° to 135° and within the range of 225° to 315°. Accordingly, when the rotation angle of the rotary shaft 4 falls within these ranges, the rotation sensor 2 can measure the rotation angle of the rotary shaft 4 with high accuracy.

In the rotation sensor 2 according to the present invention, the core 22 of the magnetic coil/core unit and the rotor 12 are arranged so as to face each other in the axial direction of the rotary shaft 4, as distinct from the conventional rotation sensor mentioned above. Compared with the conventional rotation sensor, therefore, the rotation sensor 2 can be significantly reduced in size. Specifically, the conventional rotation sensor has a diameter of 100 mm, a thickness of 22 mm and a weight of 150 g, while the rotation sensor 2 of the present invention has a diameter of 70 mm, a thickness of 8 mm and a weight of 40 g. Further, the cost of the rotation sensor 2 of the present invention is lower than that of the conventional rotation sensor.

The rotation sensor 2 is provided with the yoke plate 26 as mentioned above. Accordingly, the yoke plate 26 forms the magnetic circuit M in cooperation with the core 22 and the surrounding yoke 23, and the air gap G thereof is defined as a distance between the yoke plate 26 and the core 22 or the surrounding yoke 23, as shown in FIG. 3. Thus, since the central magnetic flux $F_s$ has a uniform density in the portion thereof passing through the band 16 of the rotor 12, even if the rotor 12 is vibrated in the axial direction thereof by unexpected cause, eddy current having an intensity proportional to the rotation angle of the rotor 12 is produced in the band 16. As a result, the rotation sensor 2 is capable of accurately detecting the rotation angle of the rotor 12, that is, the rotary shaft 4.

Although the aforementioned rotation sensor 2 of the present invention has a single magnetic coil/core unit, that is, one core 22 (one exciting coil 24), it may be provided with first and second magnetic coil/core units.

Figure 2:
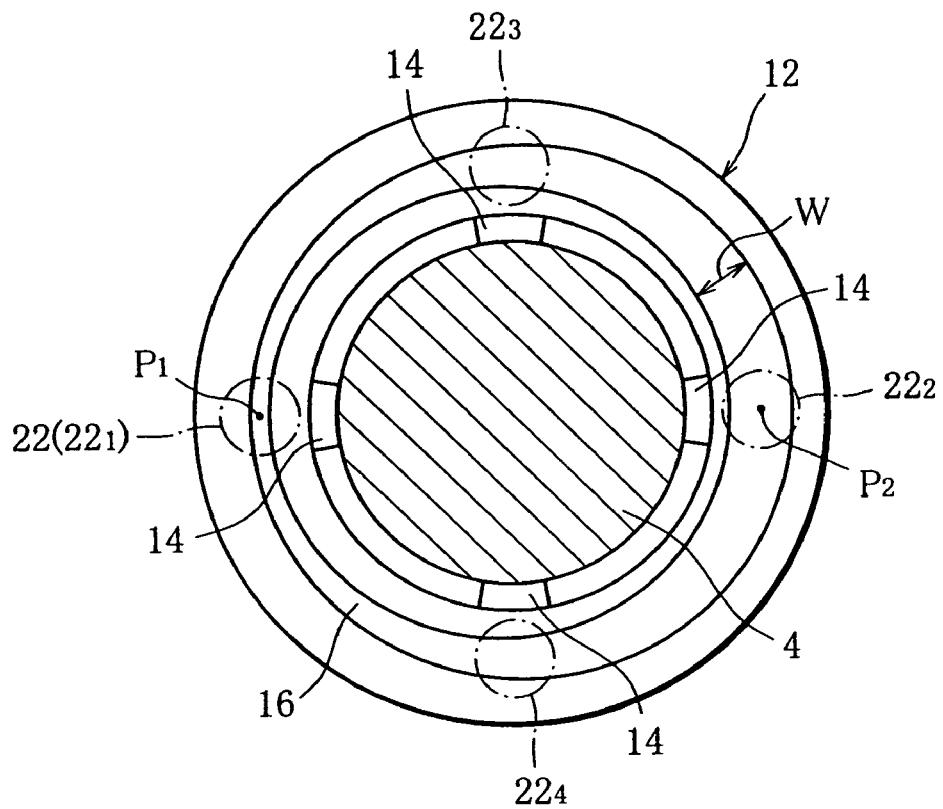
FIG. 2 is a view showing a lower surface of a rotor appearing in FIG. 1.

For example, in addition to the core 22 or the first core $22_1$ which is located at the position $P_1$ when the rotor 12 is in the neutral position as shown in FIG. 2, a second core $22_2$ may be provided which is located at the position $P_2$. The second core $22_2$ is also enclosed with the exciting coil 24 of the second magnetic coil/core unit and arranged on the measurement substrate 18, and the first and second cores $22_1$ and $22_2$ are separated from each other in a diametrical direction of the rotor 12.

Figure 6:
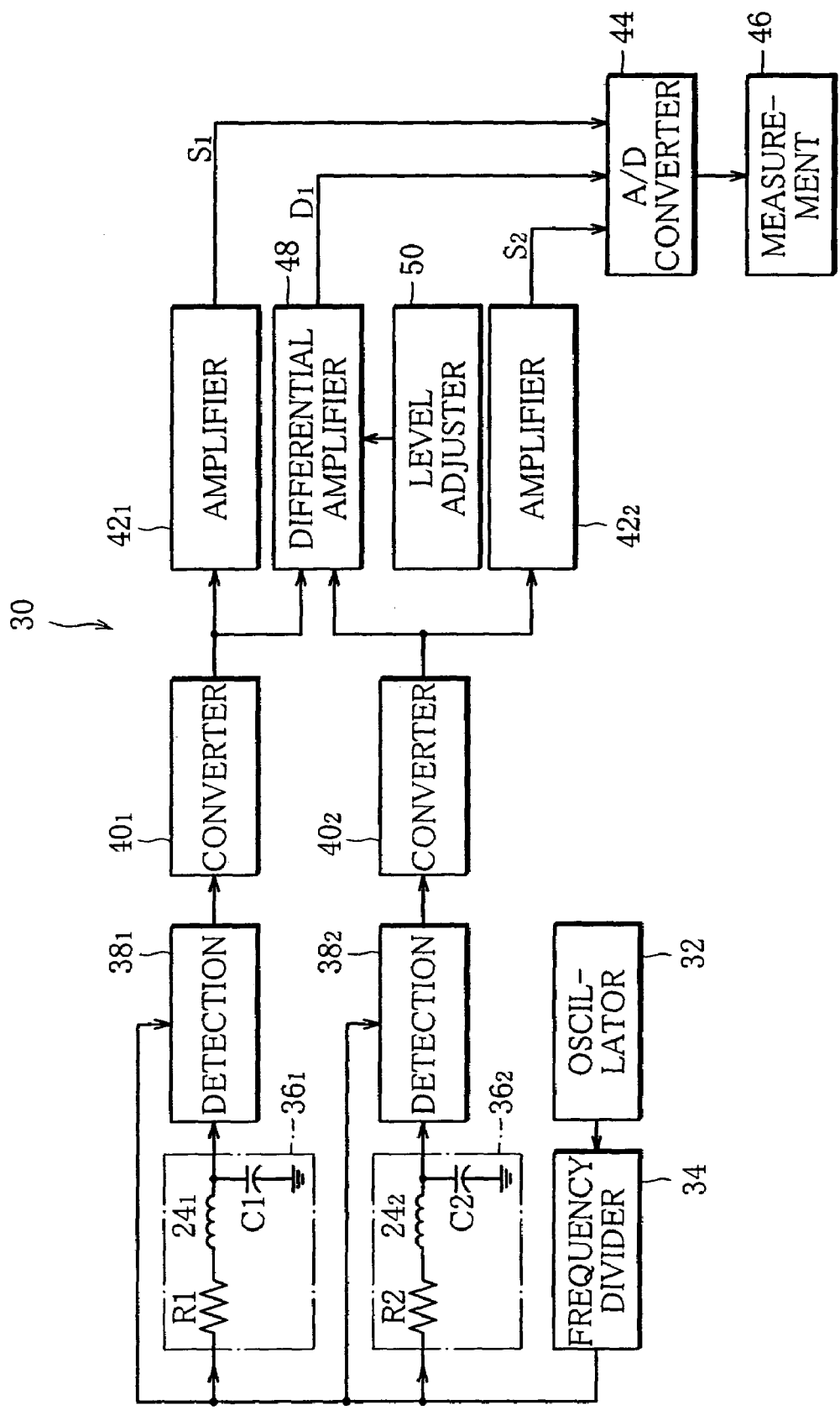
FIG. 6 is a block diagram of a rotation angle detection circuit used in a modification of the rotation sensor.

In the case where the first and second magnetic coil/core units are used, the rotation angle detection circuit 30 is modified as shown in FIG. 6.

Like the first exciting coil $24_1$, the second exciting coil $24_2$ of the second magnetic coil/core unit is arranged between the frequency divider 34 and the A/D converter 44. In FIG. 6, therefore, identical reference numerals are used to denote circuit sections and elements associated with the second exciting coil $24_2$ and having functions identical with those associated with the first exciting coil $24_1$, and description of such sections and elements are omitted. Also, in FIG. 6, to facilitate distinction between the circuit sections and elements associated with the first exciting coil $24_1$, and those associated with the second exciting coil $24_2$, the reference numerals indicating such circuit sections and elements are suffixed with subscripts identical with those of the reference numerals indicating the respective exciting coils.

As shown in FIG. 6, the outputs from the converters $40_1$ and $40_2$ are supplied to the respective amplifiers $42_1$ and $42_2$, and also supplied to a differential amplifier 48. The differential amplifier 48 derives a difference between the outputs from the converters $40_1$ and $40_2$, and produces the output difference as an amplified voltage difference signal $D_1$. The voltage difference signal $D_1$ is supplied from the differential amplifier 48 to the measurement section 46 through the A/D converter 44.

The differential amplifier 48 is also connected with a level adjuster 50. The level adjuster 50 supplies the differential amplifier 48 with an adjust signal for adjusting the voltage level of the voltage difference signal $D_1$.

In the rotation angle detection circuit 30 of FIG. 6, the measurement section 46 receives not only the voltage signals $S_1$ and $S_2$ obtained by the first and second exciting coils $24_1$ and $24_2$, respectively, but also the voltage difference signal $D_1$ from the differential amplifier 48. In FIG. 5, the voltage signal $S_2$ and the voltage difference signal $D_1$ are indicated by the broken and solid lines, respectively. As is clear from FIG. 5, the phases of the voltage signals $S_1$ and $S_2$ are shifted from each other by 180° and because of the positioning of the core $22_1$ and $22_2$. In this case, the voltage difference signal $D_1$ is in phase with the voltage signal $S_1$. More specifically, the change directions of the voltage signals $S_1$ and $S_2$ are opposite to each other as the rotor 12 is rotated.

Even if external disturbance such as vibrations acts on the rotation sensor 2 and causes change in the impedances of the first and second exciting coils $24_1$ and $24_2$, the impedances change in the opposite direction. Accordingly, when the voltage difference signal $D_1$ is derived based on the difference between the voltage signals $S_1$ and $S_2$, noises introduced into the voltage signals $S_1$ and $S_2$ due to the disturbance are canceled out, so that the amplified signal $D_1$ is never adversely affected by such noise. As a result, the measurement section 46 can accurately detect the rotation angle of the rotor 12, that is, the rotary shaft 4, based on the voltage difference signal $D_1$, and thus the S/N ratio of the output of the rotation sensor 2 greatly improves.

As is clear from FIG. 5, the waveform of the voltage difference signal $D_1$ is symmetrical with respect to the neutral position of the rotor 12. To detect the rotation angle of the rotary shaft 4 based on the voltage difference signal $D_1$, therefore, it is necessary that the direction of rotation of the rotary shaft 4 should be known.

To meet the requirement, the rotation sensor 2 of the present invention may be further provided with a third magnetic coil/core unit, that is, a third core $22_3$, enclosed with a third exciting coil $24_3$. As shown in FIG. 2, the third core $22_3$ is arranged at an intermediate position between the first and second cores $22_1$ and $22_2$, as viewed in the circumferential direction of the rotor 12.

Figure 7:
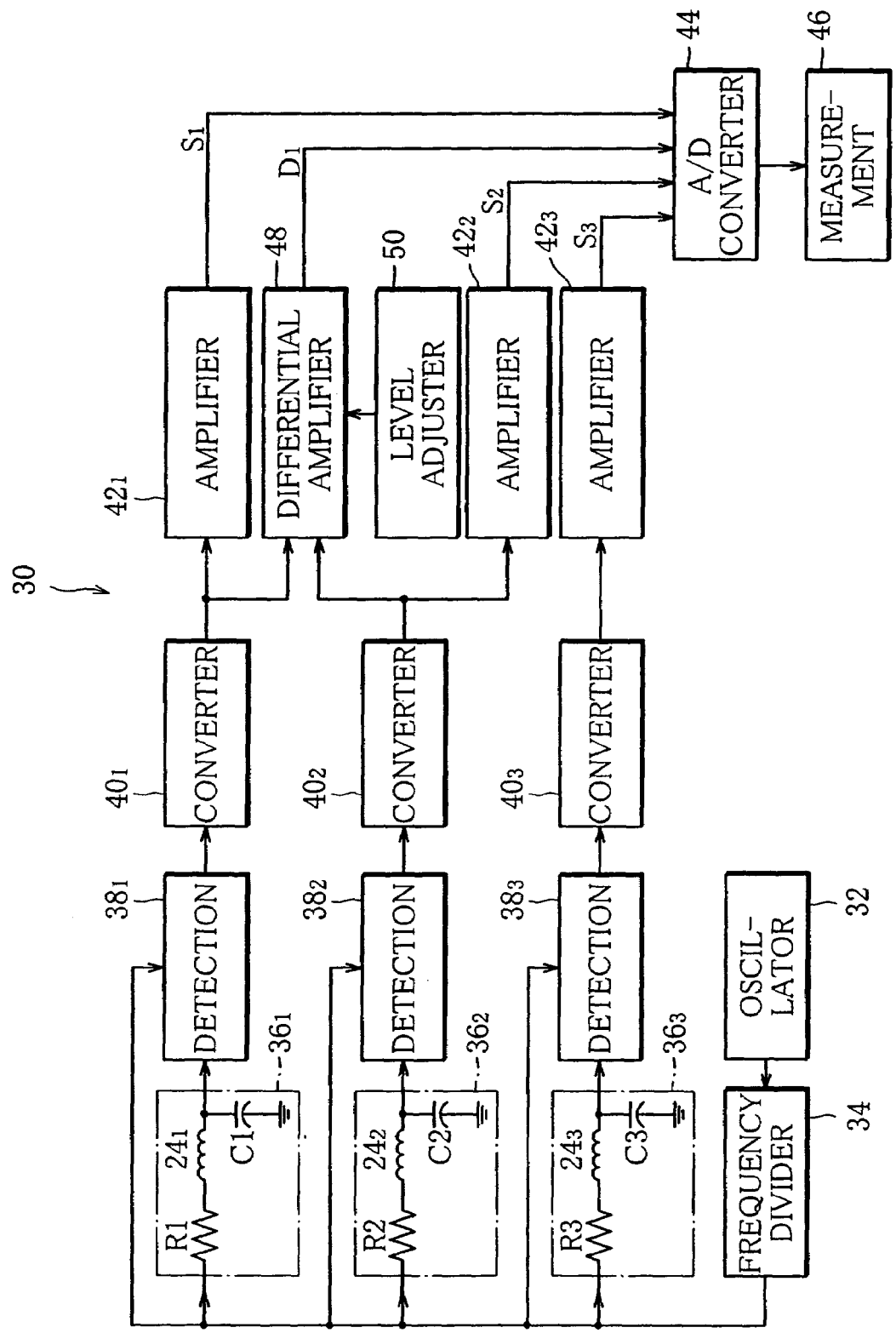
FIG. 7 is a block diagram of a rotation angle detection circuit used in another modification of the rotation sensor.

In this case, the rotation angle detection circuit 30 mounted on the measurement substrate 18 is modified as shown in FIG. 7. Also in FIG. 7, like reference numerals are used to denote like circuit sections and elements associated with the third exciting coil $24_3$ and are suffixed with a subscript identical with that of the reference numeral indicating the third exciting coil $24_3$.

In the rotation angle detection circuit 30 of FIG. 7, the measurement section 46 further receives a voltage signal $S_3$ which is derived by the third exciting coil $24_3$. The voltage signal $S_3$ is indicated by the dot-dash line in FIG. 8. As clearly shown in FIG. 8, the phase of the voltage signal $S_3$ is shifted by 90° from that of each of the voltage signals $S_1$ and $S_2$, and therefore, a median value K of the amplitude of the voltage signal $S_3$ can be used to determine the rotating direction of the rotary shaft 4. Specifically, it is determined after the rotor 12 is rotated from the neutral position whether the level of the voltage signal $S_3$ is higher or lower than the criterion K, and this permits the measurement section 46 to determine the rotating direction of the rotor 12, that is, the rotary shaft 4. Also, based on the combination of the voltage difference signal $D_1$ and the voltage signal $S_3$, the measurement section 46 can detect the rotation angle of the rotary shaft 4 over the entire range of 0° through 360°. Specifically, in the case where the rotor 12 is rotated clockwise, while the level of the voltage signal $S_3$ is lower than the criterion K, the voltage difference signal $D_1$ indicates the rotation angle of the rotor 12 within the range of 0° to 180°, and while the level of the voltage signal $S_3$ is higher than the criterion K, the voltage difference signal $D_1$ indicates the rotation angle of the rotor 12 within the range of 180° to 360°.

Figure 8:
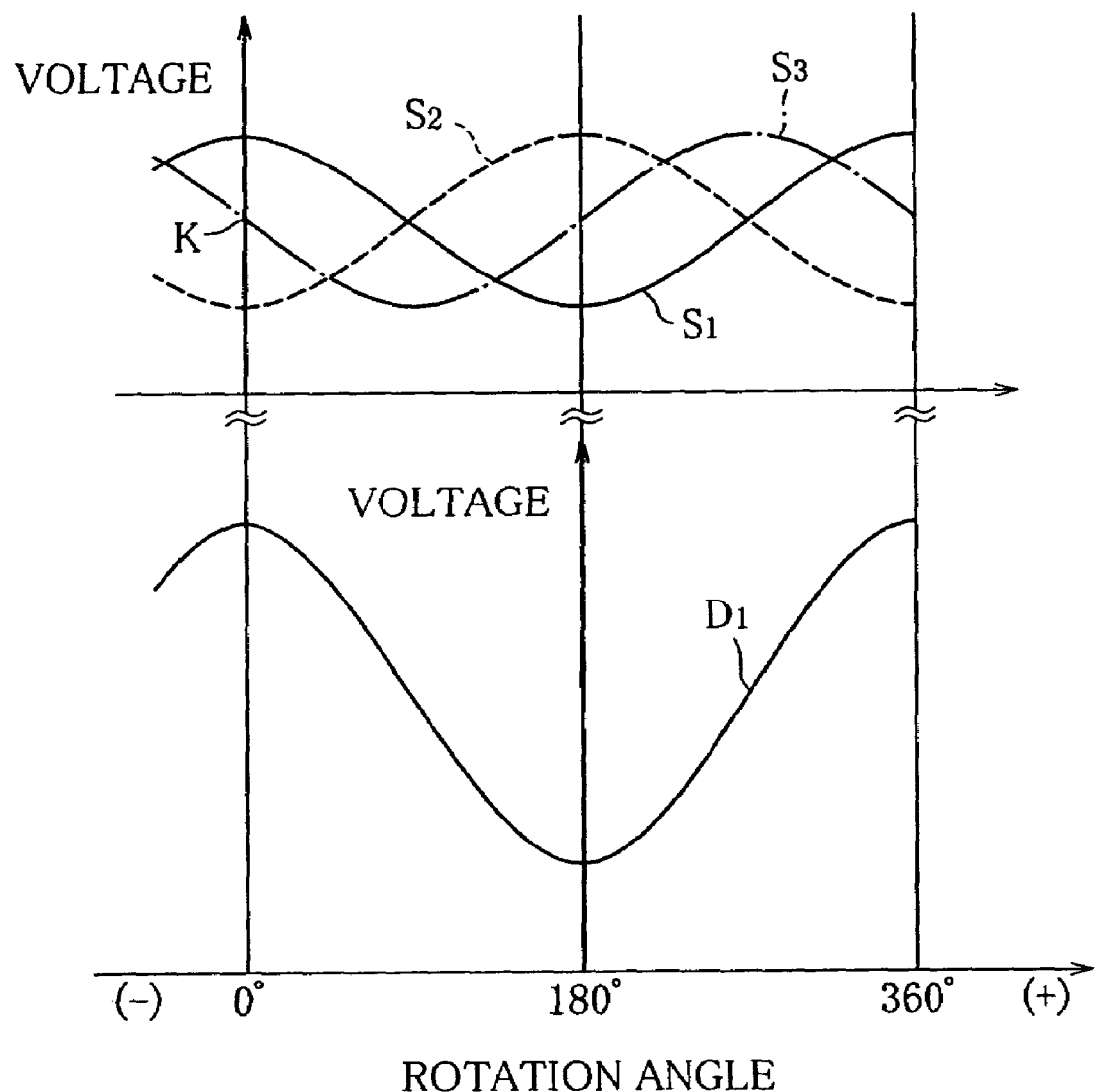
FIG. 8 is a graph showing output to a measurement section appearing in FIG. 7.

As will be clear from FIG. 8, rotational angular regions of the rotor 12 in the vicinities of 0° (360°) and 180° correspond to crest and bottom regions, respectively, of the sine curve indicating the voltage difference signal $D_1$. Since, in these regions, the voltage difference signal $D_1$ does not linearly change with rotation of the rotor 12, the accuracy of the output of the rotation sensor 2 lowers.

To eliminate the inconvenience, the rotation sensor 2 of the present invention may be further provided with a fourth magnetic coil/core unit, that is, a fourth core $22_4$ enclosed with a fourth exciting coil $24_4$. The fourth core $22_4$ is arranged on the measurement substrate 18 so as to be separated from the third exciting core $22_3$ in a diametrical direction of the rotor 12, as shown in FIG. 2.

Figure 9:
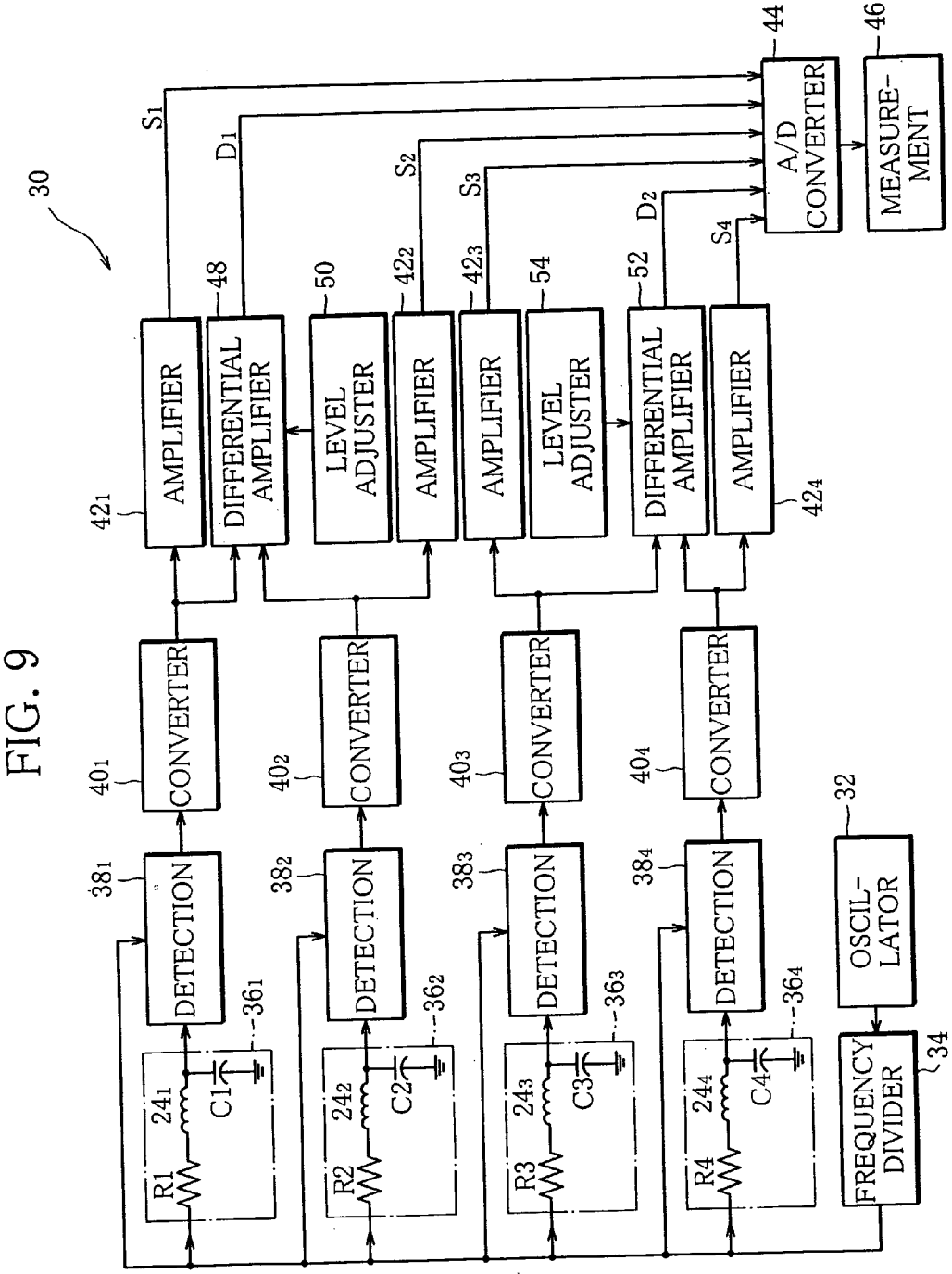
FIG. 9 is a block diagram of a rotation angle detection circuit used in a further modification of the rotation sensor.

In this case, the rotation angle detection circuit 30 is modified as shown in FIG. 9. Also in FIG. 9, like reference numerals are used to denote like circuit sections and elements associated with the fourth exciting coil $24_4$ and are suffixed with a subscript identical with that of the reference numeral indicating the fourth exciting coil $24_4$.

As shown in FIG. 9, the outputs from the converters $40_3$ and $40_4$ are supplied to the corresponding amplifiers $42_3$ and $42_4$, and also supplied to a differential amplifier 52. The differential amplifier 52 derives a difference between the outputs from the converters $40_3$ and $40_4$, and produces the output difference as an amplified voltage difference signal $D_2$. The voltage difference signal $D_2$ is supplied from the differential amplifier 52 to the measurement section 46 through the A/D converter 44.

Figure 10:
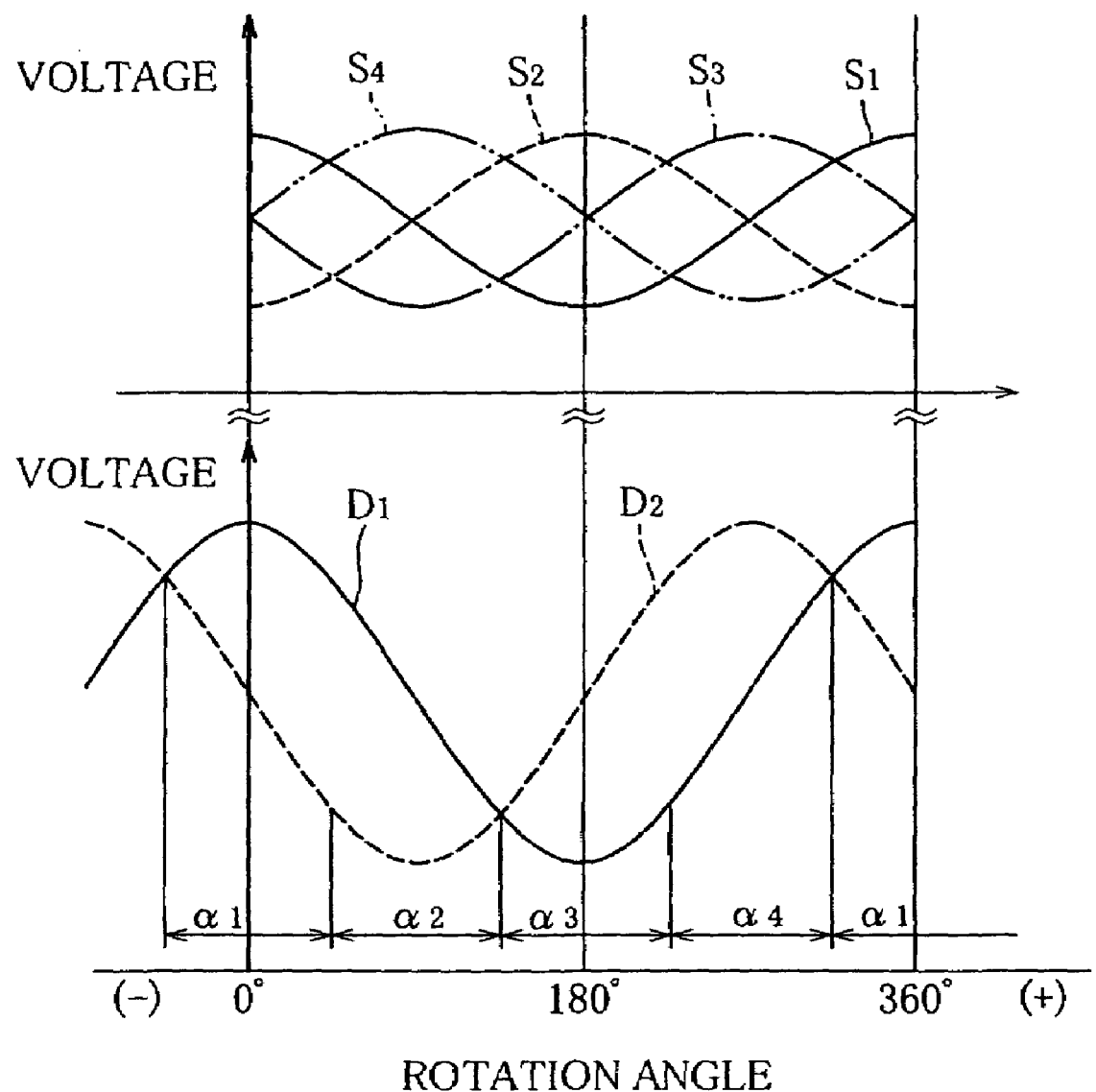
FIG. 10 is a graph showing output to a measurement section appearing in FIG. 9.

In the rotation angle detection circuit 30 of FIG. 9, therefore, the measurement section 46 receives not only the voltage signals $S_1$, $S_2$, $S_3$ and the voltage difference signal $D_1$, but also the voltage signal $S_4$ and the voltage difference signal $D_2$. In FIG. 10, the voltage signal $S_4$ and the voltage difference signal $D_2$ are indicated by the two-dot-dash line and the broken line, respectively. As is clear from FIG. 10, the phases of the voltage difference signals $D_1$ and $D_2$ are shifted from each other by 90°.

Accordingly, the measurement section 46 selectively uses the voltage difference signal $D_1$ or $D_2$ based on the voltage signals $S_1$ to $S_4$, whereby the rotation angle of the rotor 12 and thus the rotary shaft 4 can be detected with accuracy.

Specifically, the rotation angle is detected in the manner described below.

i) When the conditions $|S_2-S_1| \geq |S_4-S_3|$ and $S_2 > S_1$ are fulfilled and the rotation angle of the rotor 12 is within the range $\alpha_1$ ($-45° \leq \alpha_1 < 45°$), the voltage difference signal $D_2$ varies more linearly than the voltage difference signal $D_1$ as the rotor 12 rotates. In this range, therefore, the measurement section 46 detects the rotation angle of the rotor 12 based on the voltage difference signal $D_2$.

ii) When the conditions $|S_4-S_3|>|S_2-S_1|$ and $S_4>S_3$ are fulfilled and the rotation angle of the rotor 12 is within the range $\alpha_2$ ($45° \leq \alpha_2 < 135°$), the voltage difference signal $D_1$ varies more linearly than the voltage difference signal $D_2$ as the rotor 12 rotates. Accordingly, in this range, the measurement section 46 detects the rotation angle of the rotor 12 based on the voltage difference signal $D_1$.

iii) When the conditions $|S_2-S_1| \geq |S_4-S_3|$ and $S_2<S_1$ are fulfilled and the rotation angle of the rotor 12 is within the range $\alpha_3$ ($135° \leq \alpha_3 < 225°$), the voltage difference signal $D_2$ varies more linearly than the voltage difference signal $D_1$ as the rotor 12 rotates. Thus, in this range, the measurement section 46 detects the rotation angle of the rotor 12 based on the voltage difference signal $D_2$.

iv) When the conditions $|S_4-S_3|>|S_2-S_1|$ and $S_4<S_3$ are fulfilled and the rotation angle of the rotor 12 is within the range $\alpha_4$ ($225° \leq \alpha_4 < 315° (=-45°)$), the voltage difference signal $D_1$ varies more linearly than the voltage difference signal $D_2$ as the rotor 12 rotates. In this range, therefore, the measurement section 46 detects the rotation angle of the rotor 12 based on the voltage difference signal $D_1$.

The measurement substrate 18 on which the rotation angle detection circuit 30 is mounted may be arranged outside the casing 6, and in this case, the core 22 with the respective exciting coils are directly attached to the bottom of the casing 6.

Also, where two or more magnetic coil/core units are used as mentioned above, the cores 22 and the surrounding yoke 23 may be constituted by a single common ring member which surrounds the rotary shaft 4 and which has annular recesses for receiving the respective exciting coils 24. Further, the yoke plates 26 also may be constituted by a single disc member common to the magnetic coil/core units.

Figure 11:
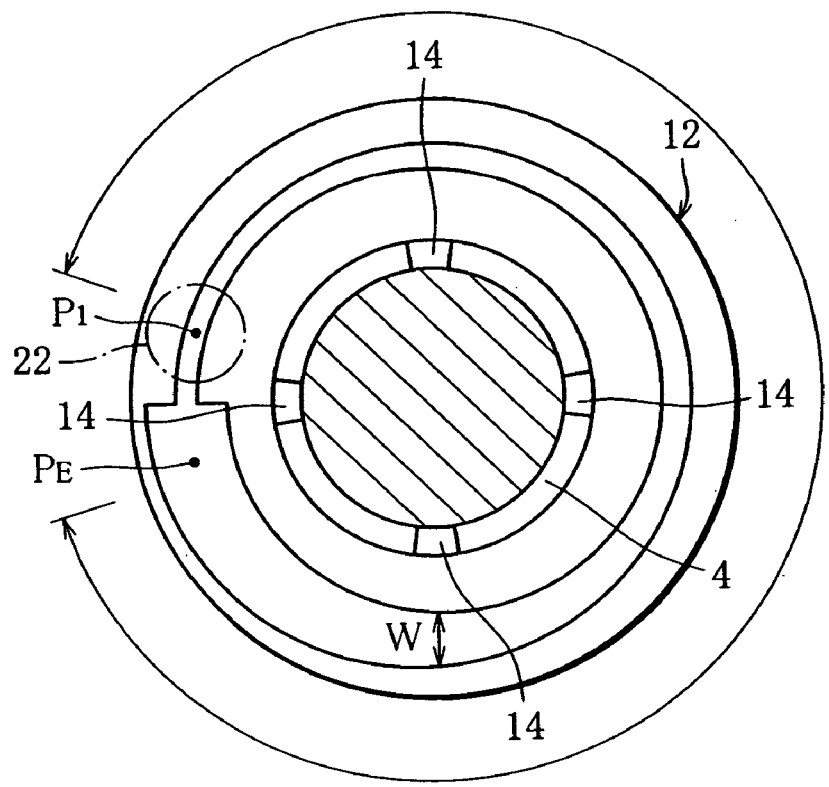
FIG. 11 is a view showing a lower surface of a modification of the rotor.

The band 16 may be replaced with a band 17 as shown in FIG. 11. The band 17 is also in the form of a ring extending along the entire circumference of the rotor 12 and has a width W gradually increasing from the position $P_1$ (the neutral position) to a near position $P_E$ along the circumference of the rotor 12. The position $P_1$ and the near position $P_E$ are slightly separated from each other in the circumferential direction of the rotor 12, and the width W has a maximum value a the near position $P_E$. In this case, the rotation sensor 2 of the present invention can detect not only the rotational angle of the rotor 12 within the range of 0° to about 360° but also the rotational direction of the rotor 12. In addition, the width W between the position $P_1$ and the near position $P_E$ is a constant or gradually decreased from the position $P_1$ toward the near position $P_E$.

The above embodiments are based on the fact that the impedance of the exciting coil 24 changes due to eddy current induced on the band 16 of the rotor 12, and the rotation angle of the rotor 12 is detected based on change in the impedance.

The impedance of the exciting coil 24 changes also when the size of an air gap in the magnetic circuit M formed by the magnetic coil/core unit or the core 22 changes. Accordingly, based on this principle, the rotation sensor 2 of the present invention may detect the rotation angle of the rotary shaft 4.

Figure 12:
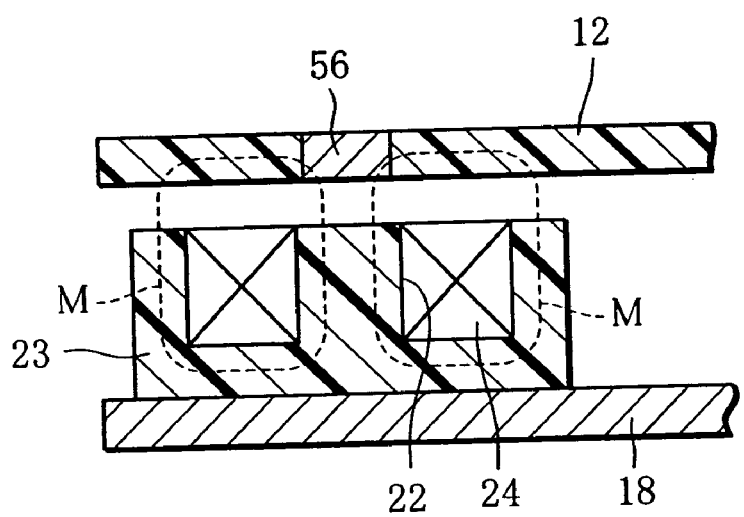
FIG. 12 is a sectional view showing part of a modification of the rotation sensor.

In this case, the rotor 12 of the rotation sensor 2 is provided, instead of the band 16, with a magnetic ring 56, shown in FIG. 12, as the annular element. The magnetic ring 56 is made of the aforementioned magnetic material having electrical insulating property and has a shape similar to that of the band 16. Namely, the magnetic ring 56 has a width gradually increasing from the position $P_1$ toward the position $P_2$, and the maximum width of the ring 56 is narrower than the diameter of the core 22. Further, the magnetic ring 56 is embedded in the rotor 12 and has a thickness equal to that of the rotor 12.

The magnetic ring 56 forms a magnetic circuit M in cooperation with the core 22, the surrounding yoke 23 and the rotor 12 of the unit when the coil 24 is excited, and in this case, the air gap in the magnetic circuit M is defined between the surrounding yoke 23 and the magnetic ring 56. The rotation sensor 2 shown in FIG. 12 does not require the use of the aforementioned yoke plate 26.

As the rotor 12 is rotated, the width of the magnetic ring 56 which the core 22 is facing increases in proportion to the rotation angle of the rotor 12, and as the width of the ring 56 increases, the effective size of the air gap between the magnetic ring 56 and the surrounding yoke 23 is also increases, or the width of the magnetic ring 56 which the core 22 is facing decreases in proportion to the rotation angle of the rotor 12, and as the width of the ring 56 decreases, the effective size of the air gap between the magnetic ring 56 and the surrounding yoke 23 is also decreases.

As a result, the shape of the magnetic circuit M changes, then the impedance of the exciting coil 24 thereof changes, and based on the impedance change, the rotation angle of the rotor 12 and thus the rotary shaft 4 is detected. For a detection circuit for detecting the rotation angle, a circuit similar to the aforementioned rotation angle detection circuits 30 may be used.

Figure 13:
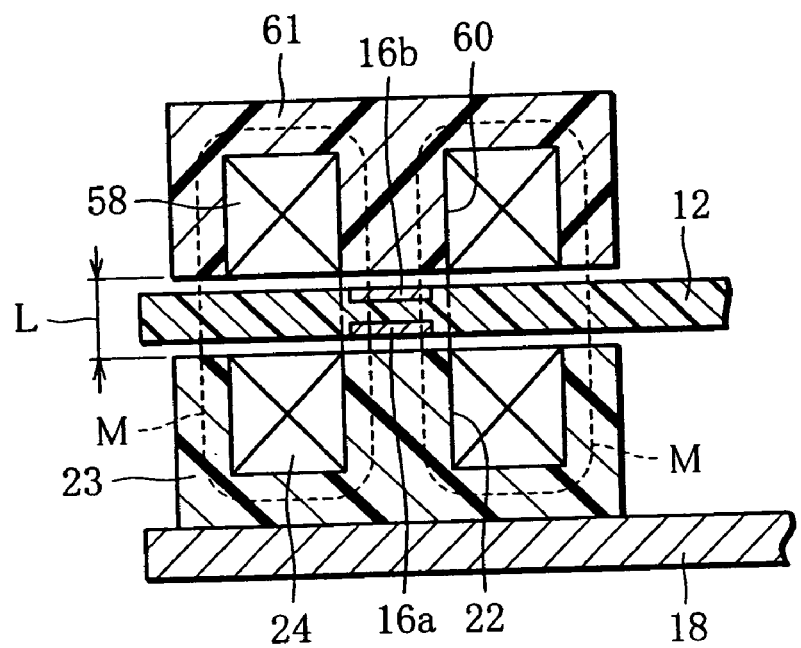
FIG. 13 is a sectional view showing part of another modification of the rotation sensor.

Also, as shown in FIG. 13, the rotation sensor 2 may further include an upper coil/core unit similar to the magnetic coil/core unit with the core 22. The upper coil/core unit includes a core 60 enclosed with an exciting coil 58. The core 60 is arranged so as to face the core 22 with the rotor 12 therebetween, and has integrally a surrounding yoke 61 similar to the surrounding yoke 23. The core 60 is attached to the end plate 10 of the casing 6, and a gap L is secured between the cores 60 and 22.

The upper coil/core unit (58, 60) is associated with each lower coil/core units (24, 22), and accordingly, the number of the exciting coils 58 (core 60) is equal to that of the exciting coils 24 (core 22).

In this case, the exciting coil 58 is connected in series with the corresponding exciting coil 24 and constitutes the shifting section 36 of the rotation angle detection circuit 30. Thus, the exciting coils 24 and 58 cooperate with each other to produce a magnetic circuit M.

The rotor 12, on the other hand, is made of magnetic material having electrical insulating property and has bands 16a and 16b formed on lower and upper surfaces of the rotor 12, respectively. The bands 16a and 16b are made of electrically conductive material and have a shape similar to that of the aforementioned band 16. Further, the bands 16a and 16b are arranged such that portions of one band having the minimum and maximum widths are located at positions where portions of the other hand having the minimum and maximum widths in view of the circumferential direction of the rotor 12, respectively.

In the rotation sensor 2 shown in FIG. 13, the distance L between the cores 22 and 60 is constant, and accordingly, even if the rotor 12 vibrates in the axial direction thereof, such vibration does not adversely affect the output of the rotation sensor 2.

Specifically, if the rotor 12 moves up and down between the cores 22 and 60, as viewed in FIG. 13, the movement of the rotor causes a change in a lower distance between the rotor 12 and the core 22 as well as in an upper distance between the rotor 12 and the core 60. In such cases, when one of the lower and upper distances shortens, the other inevitably lengthens. Accordingly, even if variations in the lower and upper distances cause a change in impedance of the individual exciting coils 24 and 58, the impedances change in opposite directions such that the impedance changes are canceled out, and thus the output of the rotation sensor 2 is not adversely affected. As a consequence, the output of the rotation sensor 2 does not include noise attributable to vibration, and therefore, the rotation sensor 2 shown in FIG. 13 is capable of high-accuracy detection of the rotation angle of the rotor 12.

The rotation sensor 2 of FIG. 1 has dimensions such that the rotor 12 is 55 mm in diameter and that a gap of 1.6 mm is secured between the core 22 and the yoke plate 26, for example. If the rotor 12 of the rotation sensor 2 of FIG. 1 having such dimensions is vibrated with an amplitude of ±0.2 mm in the axial direction of the rotary shaft 4, then the rotation sensor 2 has an output error $E_1$ of ±5%.

By contrast, where the rotor 12 of the rotation sensor 2 of FIG. 13 has the same size as that of the rotation sensor 2 of FIG. 1 and the distance L between the cores 22 and 60 is 1.6 mm, the output error $E_2$ of the rotation sensor 2 of FIG. 13 is reduced to about 1/25 (a range of ±0.2% with respect to the median $E_1/25$) of the output error $E_1$ of the rotation sensor 2 of FIG. 1.

Figure 14:
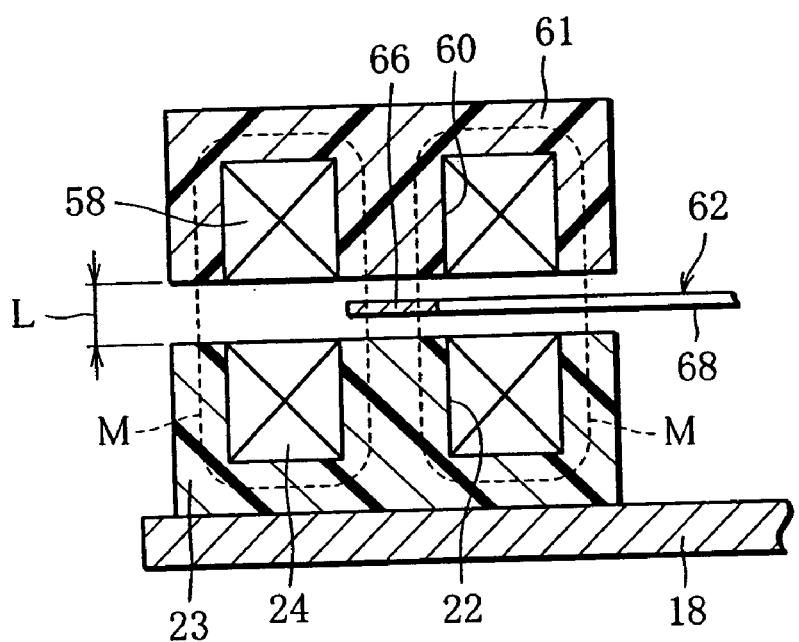
FIG. 14 is a sectional view showing part of still another modification of the rotation sensor.

The rotation sensor 2 of FIG. 13 may alternatively use a metal rotor 62 as shown in FIG. 14, in place of the rotor 12. The metal rotor 62 is made of electrically conductive material such as aluminum or copper.

Figure 15:
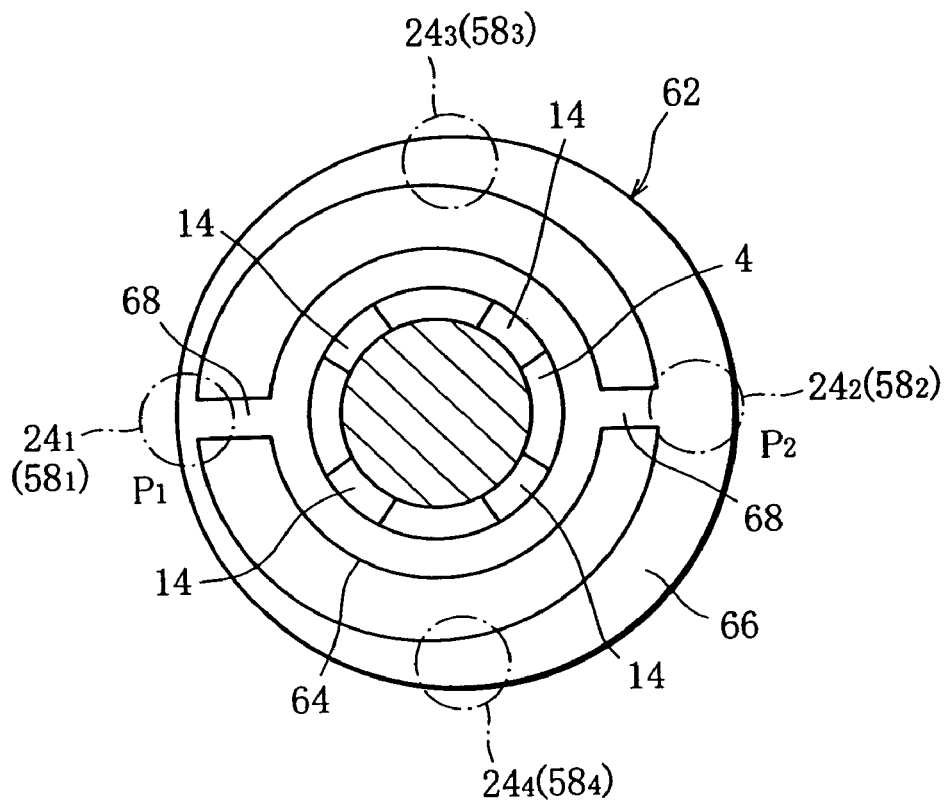
FIG. 15 is a plan view showing a metal rotor used in the rotation sensor of FIG. 14.

Like the aforementioned band 16, the metal rotor 62 is obtained by being blanked from an electrically conductive metal sheet. As shown in FIG. 15, the metal rotor 62 has an inner ring portion 64 located at its center, an outer ring portion or a band portion 66 surrounding the inner ring portion 64, and two bridge portions 68 connecting the band portion 66 and the inner ring portion 64. The two bridge portions 68 are separated from each other in a diametrical direction of the inner ring portion 64.

The band portion 66 is an element corresponding to the aforementioned band 16, and accordingly, has a width gradually increasing from the position $P_1$ toward the position $P_2$.

As seen from FIG. 15, the metal rotor 62 is attached at its inner ring portion 64 to the rotary shaft 4 by means of the aforementioned dampers 14.

In the case of using four pairs of lower and upper coil/core units with cores 22 and 60, respectively, the four pairs are arranged at regular intervals in the circumferential direction of the metal rotor 62, as shown in FIG. 15.

Since the metal rotor 62 is blanked from a conductive metal sheet as mentioned above, it is smaller in thickness than the rotor 12 and is inexpensive. Thus, even if the distance L between the cores 22 and 60 is small, the metal rotor 62 can be easily arranged between the cores 22 and 60.

Figure 16:
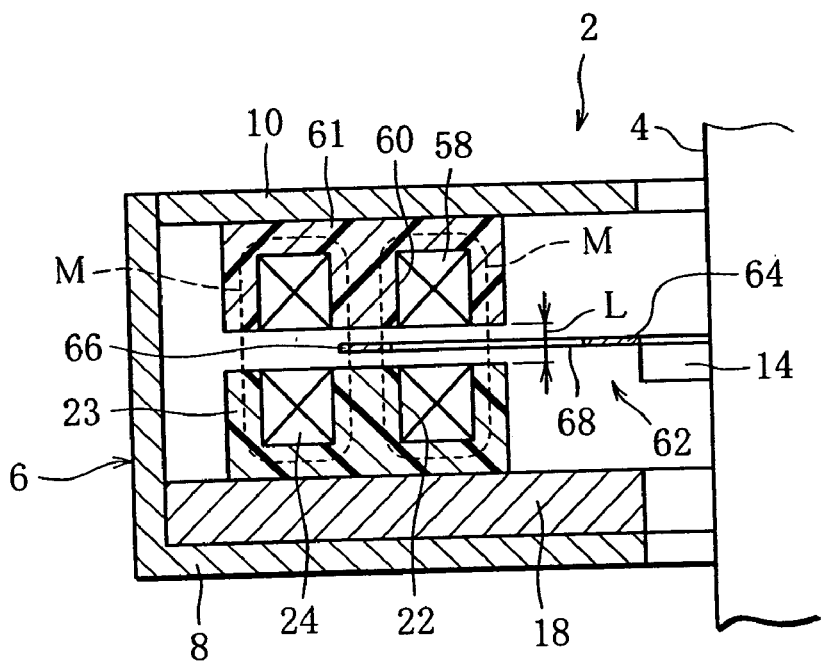
FIG. 16 is a sectional view showing part of the rotation sensor of FIG. 14 along with a casing thereof.

FIG. 16 illustrates a state in which the rotation sensor 2 shown in FIGS. 14 and 15 is mounted to the rotary shaft 4.

The rotary shaft 4, to which the rotation sensor 2 is mounted, simply transmits rotation from the input member to the output member, but the rotation sensor of the present invention is also applicable to the steering shaft of an automotive steering system. In this case, the rotation sensor is required to detect not only the rotation angle of the steering shaft but the rotational torque acting on the steering shaft.

Figure 17:
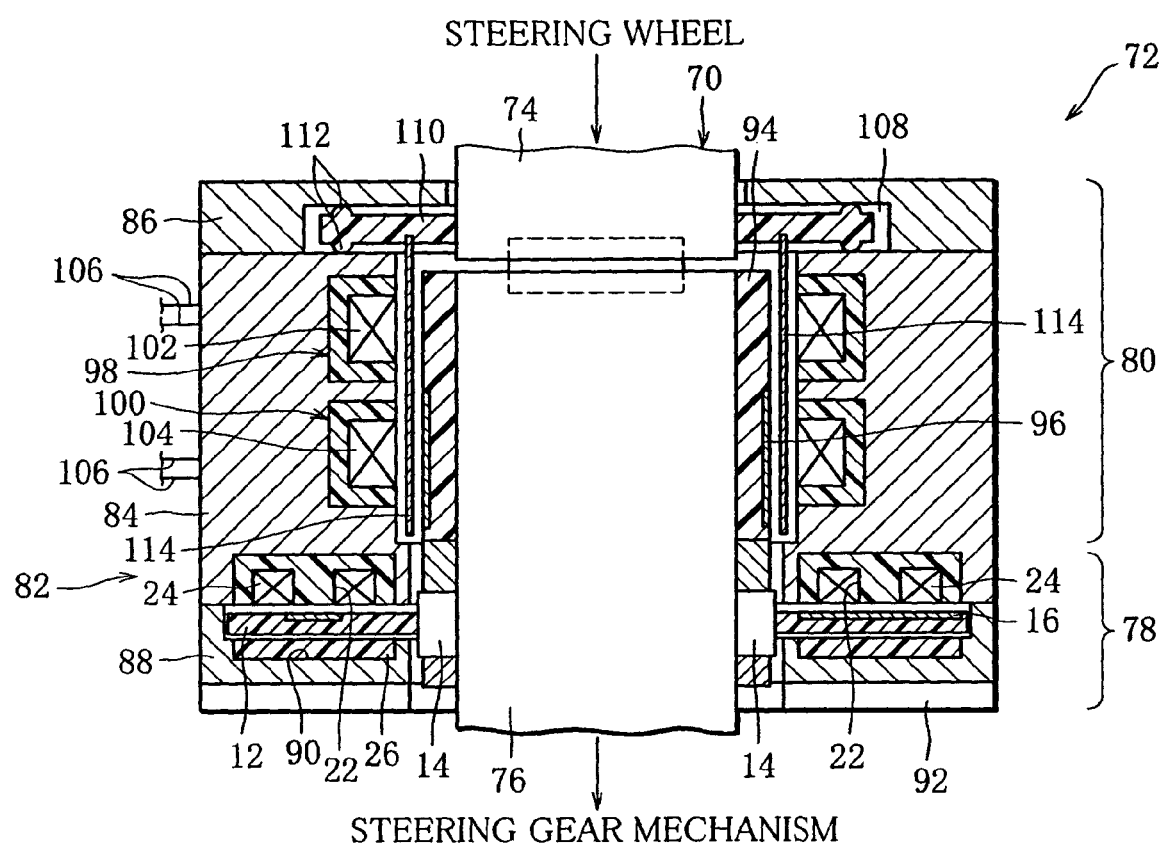
FIG. 17 is a sectional view of a rotation sensor applied to a steering shaft of a motor vehicle.
Figure 18:
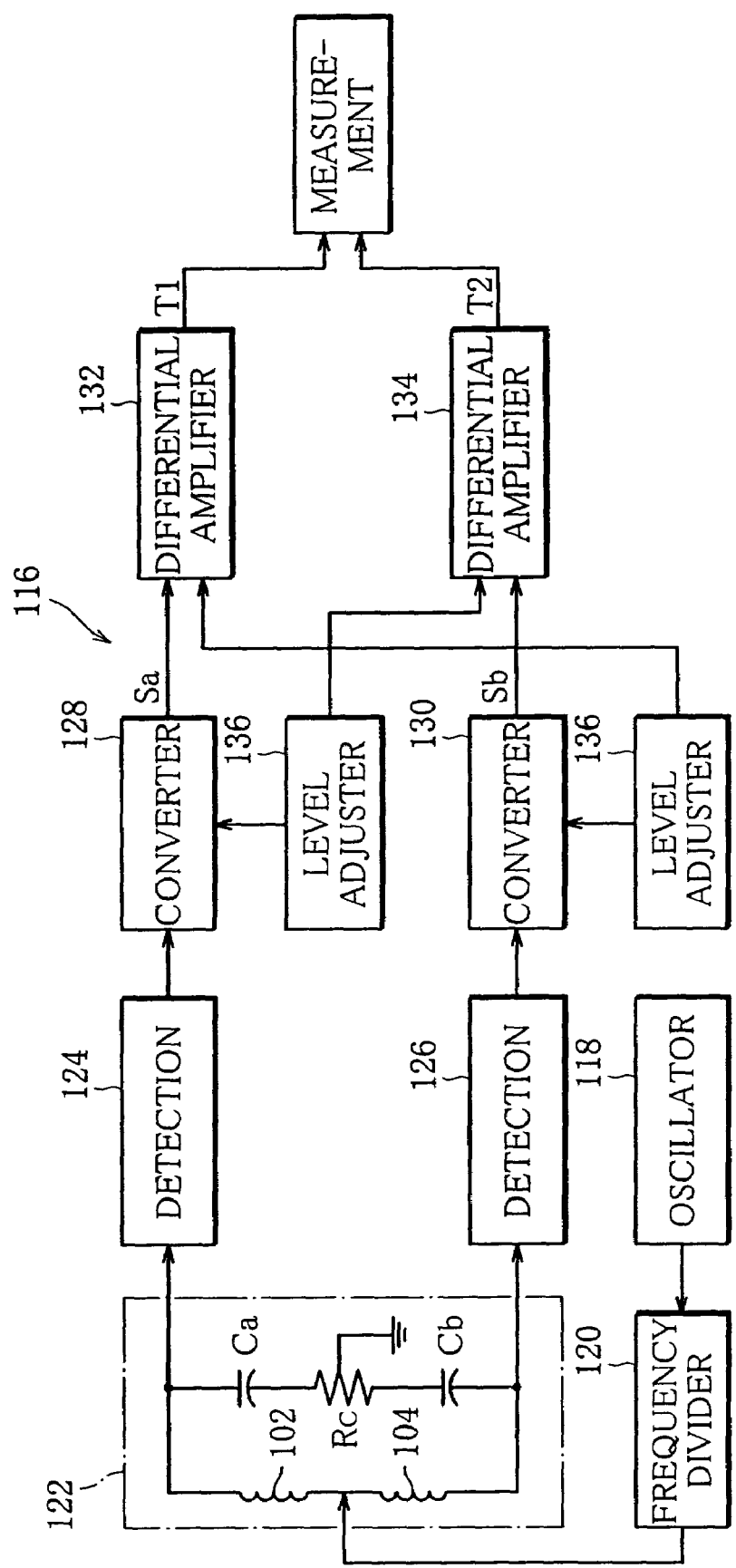
FIG. 18 is a block diagram of a relative rotation angle detection circuit in the rotation sensor of FIG. 17.

FIG. 17 illustrates a rotation sensor 72 applied to a steering shaft 70.

The steering shaft 70 includes an upper shaft portion 74 connected to a steering wheel of the steering system, and a lower shaft portion 76 connected to the steering gear mechanism thereof, and the shaft portions 74 and 76 are connected to each other by a torsion bar (not shown). The torsion bar permits rotation of the upper shaft portion 74 relative to the lower shaft portion 76, and the upper shaft portion 74 is allowed to rotate relative to the lower shaft portion 76 within a range of ±8°, for example.

The rotation sensor 72 includes a first sensor device 78 for detecting the rotation angle of the lower shaft portion 76, and a second sensor device 80 for detecting the angle of relative rotation, or relative angular displacement, between the upper and lower shaft portions 74 and 76. The first and second sensor devices 78 and 80 are contained in a common casing 82. The steering shaft 70 extends through the casing 82, and the casing 82 is fixed to a bracket attached externally to the steering shaft 70.

The casing 82 is made of metallic material, such as aluminum or copper, and has alternating magnetic field shielding property. More specifically, the casing 82 comprises a hollow cylinder 84, and upper and lower end discs 86 and 88 attached to upper and lower ends, respectively, of the cylinder 84.

The first sensor device 78 is arranged between the cylinder 84 and the lower end disc 88, and has a structure similar to that of the aforementioned rotation sensor 2 including four magnetic coil/core units with cores 22 and exciting coils 24, respectively. In FIG. 17, therefore, identical reference numerals are used to denote those elements of the first sensor device 78 which have functions identical with those of the elements of the rotation sensor 2, and description of such elements is omitted. The following describes only the features of the first sensor device 78 that are necessary to comprehend the sensor unit.

The lower end disc 88 has a recess formed in an inner surface thereof, and the recess defines a rotor chamber 90 in cooperation with the lower end face of the cylinder 84. The rotor 12 is arranged in the rotor chamber 90 and is coupled to the lower shaft portion 76 through the dampers 14. Accordingly, the rotor 12 rotates together with the lower shaft portion 76. The yoke plates 26 are fixed to the bottom of the rotor chamber 90.

Four recesses are formed in the lower end face of the cylinder 84, and the magnetic coil/core units (22, 24) are received in the respective recesses. Thus, compared with the aforementioned rotation sensor 2, the rotor 12 and the magnetic coil/core units of the first sensor device 78 are positioned upside down.

Further, an angle measurement unit 92 is attached to the lower surface of the lower end disc 88. The angle measurement unit 92 also is in the form of a disc and contains the aforementioned measurement substrate 18 having the rotation angle detection circuit 30.

Accordingly, when the lower shaft portion 76 is rotated, the first sensor device 78 can detect the rotation angle of the lower shaft portion 76 in the same manner as carried out by the aforementioned rotation sensor 2.

The second sensor device 80 is arranged above the first sensor device 78 and has a center rotor 94. The center rotor 94 is sleeve-shaped and is fitted on the lower shaft portion 76. Thus, the center rotor 94 rotates together with the lower shaft portion 76.

The center rotor 94 is made of magnetic material having electrical insulating property. Specifically, the center rotor 94 is a mixture of a thermoplastic synthetic resin and soft magnetic powder, and the content of the soft magnetic powder ranges from 10 to 70 volume %, compared with the thermoplastic resin.

For the thermoplastic synthetic resin, nylon, polypropylene (PP), polyphenylene sulfide (PPS), ABS resin or the like may be used. The magnetic powder may be powder of Ni—Zn or Mn—Zn ferrite.

As shown in FIG. 17, a plurality of conductive foils 96 are attached to the outer peripheral surface of a lower portion of the center rotor 94, and the conductive foils 96 are made of metallic material having electrical conductivity, such as copper, aluminum, silver or the like. The conductive foils 96 are arranged at regular intervals in the circumferential direction of the center rotor 94. The conductive foils 96 may be embedded in the center rotor 94.

The cylinder 84 has two circumferential grooves formed in an inner peripheral surface thereof and separated at a predetermined distance from each other in a vertical direction, or in the axial direction of the lower shaft portion 76.

The two circumferential grooves are fitted with ring-like cores 98 and 100, respectively, which are made of the same material as that of the center rotor 94, namely, magnetic material having electrical insulating property.

A small gap of several millimeters is secured between the center rotor 94 and each of the cores 98 and 100.

The cores 98 and 100 have annular grooves for receiving exciting coils 102 and 104 respectively therein. The exciting coils 102 and 104 surround the center rotor 94, and only the lower exciting coil 104 faces the lower portion of the center rotor 94, that is, the conductive foils 96.

Electric wires 106 are connected to the respective exciting coils 102 and 104, are extended to outside of the cylinder 84, and are electrically connected to the aforementioned angle measurement unit 92.

The upper end disc 86 has a recess formed in a lower surface thereof, and the recess defines a rotor chamber 108 in cooperation with the upper end face of the cylinder 84. An upper rotor 110 is arranged in the rotor chamber 108. The upper rotor 110 is in the form of a disc and is attached to the upper shaft portion 74 of the steering shaft 70. Accordingly, the upper rotor 110 rotates together with the upper shaft portion 74.

The upper rotor 110 is made of a synthetic resin having electrical insulating property and excellent formability. Ridges 112 protrude integrally from upper and lower surfaces, respectively, of the upper rotor 110 near an outer peripheral edge thereof. The ridges 112, each in the form of a circle concentric with the upper rotor 110, are disposed in sliding contact with the upper end face of the cylinder 84 and the ceiling surface of the rotor chamber 108, respectively.

The upper rotor 110 is further provided with a plurality of vanes 114. The number of the vanes 114 is equal to the number of the aforementioned conductive foils 96 of the center rotor 94. The vanes 114 are made of a metallic material having electrical conductivity, and extend downward from the lower surface of the upper rotor 110. More specifically, each of the vanes 114 extends through a space between the inner peripheral surface of the cylinder 84 and the outer peripheral surface of the center rotor 94 in a direction parallel with the axis of the lower shaft portion 76. Further, when the steering shaft 70 is in a neutral position, the lower end portions of the vanes 114 are so positioned as to partially overlap the respective conductive foils 96, respectively, in view of the circumference of the steering shaft 70.

The measurement substrate 18 in the angle measurement unit 92 has mounted thereon a relative rotation angle detection circuit 116 for the second sensor device 80, in addition to the rotation angle detection circuit 30 for the first sensor device 78. The relative rotation angle detection circuit 116 is shown in FIG. 17.

Like the rotation angle detection circuit 30, the relative rotation angle detection circuit 116 includes an oscillator 118 for generating an alternating current. The generated alternating current is turned into an alternating signal with a specific frequency by a frequency divider 120, and the resulting specific alternating signal is applied to a shifting section 122.

The shifting section 122 includes the exciting coils 102 and 104 of the second sensor device 80. The exciting coils 102 and 104 are connected in series, and the specific alternating device is applied to a point between the exciting coils 102 and 104.

The shifting section 122 further includes two capacitors $C_a$ and $C_b$ which are connected in parallel with the exciting coils 102 and 104. A resistor $R_c$ is inserted between the capacitors $C_a$ and $C_b$ and is grounded.

When applied with the specific alternating signal, each of the exciting coils 102 and 104 generates an alternating magnetic field around itself, whereby magnetic circuits are formed between the core 98 and the center rotor 93 and between the core 100 and the center rotor 94, respectively. In this case, the density of the magnetic fluxes of the magnetic circuits are periodically changed in the circumference of the center rotor 94 due to the vanes 114 and the conductive foils 96.

A detection section 124 is connected to the node between the exciting coil 102 and the capacitor $C_a$, and a detection section 126 is connected to the node between the exciting coil 104 and the capacitor $C_b$. The detection sections 124 and 126 detect the respective phase shift amounts of the coils 102 and 104.

The shift amounts detected by the detection sections 124 and 126 are converted to voltage signals $S_a$ and $S_b$ by converters 128 and 130, respectively, and the voltage signals $S_a$ and $S_b$ are supplied to differential amplifiers 132 and 134, respectively.

The converters 128 and 130 are also connected with level adjusters 136 and 138, respectively. The level adjusters 136 and 138 serve to adjust the levels of the respective voltage signals $S_a$ and $S_b$ output from the converters 128 and 130, and also supply adjusting voltages to the differential amplifiers 134 and 132, respectively.

Thus, the differential amplifier 132 supplies a measurement section 140 with a voltage difference signal $T_1$ which is based on the difference between the voltage signal $S_a$ and the adjusting voltage from the level adjuster 138, and the differential amplifier 134 supplies the measurement section 140 with a voltage difference signal $T_2$ which is based on the difference between the voltage signal $S_b$ and the adjusting voltage from the level adjuster 136.

Based on the voltage difference signals $T_1$ and $T_2$, the measurement section 140 detects the angle of relative rotation between the upper and lower shaft portions 74 and 76 of the steering shaft 70.

More specifically, when the upper and lower shaft portions 74 and 76 are rotating in unison with each other, the vanes 114 of the upper rotor 110 and the conductive foils 96 of the center rotor 94 move while maintaining their relative positions. Consequently, the difference between the voltage difference signals $T_1$ and $T_2$ remains constant. In this case, the measurement section 140 judges that there is no relative rotation between the upper and lower shaft portions 74 and 76, and thus that the rotation angle of the upper shaft portion 74 relative to that of the lower shaft portion 76 is "0" (zero).

On the other hand, if there occurs a relative rotation between the upper and lower shaft portions 74 and 76 (i.e., between the upper and center rotors 110 and 94), the total area of the magnetic flux cut by the vanes 114 and conductive foils 96 with respect to the exciting coils 102 and 104 are relatively changed. As a result, the relative change between the impedances of the exciting coils 102 and 104 causes an increase in the difference between the voltage difference signals $T_1$ and $T_2$. The amount of increase represents the rotation angle of the upper shaft portion 74 relative to the lower shaft portion 76.

Thus, based on the amount of increase in the difference between the voltage difference signals $T_1$ and $T_2$, the measurement section 140 can detect the relative rotation angle of the upper shaft portion 74. Specifically, the measurement section 140 detects the relative rotation angle within the range of −8° to +8°.

The rotation sensor shown in FIG. 17 is suited for use in an automotive steering system. The application of the present invention is, however, not limited to this alone, and the invention may be applied to a multi-joint robot, for example, in which case the rotation sensor is used to detect the angle of relative rotation between robot arms or the rotation angle and torque of the individual arms.

What is claimed is:

1. A rotation sensor for detecting an angle of rotation of a rotating member, comprising:
   a rotor mounted to the rotating member for rotation together therewith, said rotor having an annular element;
   a magnetic coil/core unit arranged opposite to said annular element and fixed to a fixing member, said magnetic coil/core unit including a core body, and an excitation coil for carrying an AC current and forming a magnetic circuit, wherein said annular element having a width varying along a circumferential direction of said rotor such that when said rotor is rotated, said annular element causes impedance of the exciting coil to change in accordance with a rotation angle of said rotor; and
   a detection device electrically connected to the exciting coil, for measuring a rotation angle of the rotating member based on change in the impedance of the exciting coil.

2. The rotation sensor according to claim 1, wherein the width of said annular element gradually increases along a half-circumference of said rotor and then gradually decreases along a remaining half-circumference of said rotor such that said annular element has a minimum width and a maximum width.

3. The rotation sensor according to claim 2, wherein said magnetic coil/core unit forms a magnetic circuit when the AC current is applied to the exciting coil, said magnetic circuit extending from the core body and passing through said annular element.

4. The rotation sensor according to claim 3, wherein said annular element is made of an electrically conductive material and generates an eddy current therein which causes the impedance of the exciting coil to change as said rotor rotates.

5. The rotation sensor according to claim 3, wherein said annular element is made of a magnetic material and causes an air gap between said annular element and said magnetic coil/core unit to change as said rotor rotates, to thereby change the impedance of the exciting coil.

6. The rotation sensor according to claim 3, wherein said rotor is made of a magnetic material, and said magnetic coil/core unit forms a magnetic circuit in cooperation with said rotor when the AC current is applied to the exciting coil, the magnetic circuit passing through said annular element.

7. The rotation sensor according to claim 3, wherein the sensor further comprise further includes a yoke member arranged such that said rotor is located between the yoke member and said the magnetic coil/core unit, and said coil/core unit forms a magnetic circuit in cooperation with the yoke member when the AC current is applied to the exciting coil, the magnetic circuit passing through said annular element.

8. The rotation sensor according to claim 3, wherein said sensor comprises a plurality of magnetic coil/core units arranged along the circumferential direction of said rotor.

9. The rotation sensor according to claim 8, wherein said rotor includes an inner ring portion to be mounted to the rotating member and an outer ring portion connected to the inner ring portion through bridges, the outer ring portion being formed as said annular element.

10. The rotation sensor according to claim 8, wherein said magnetic coil/core unit includes a set of two magnetic coil/core units arranged both side of said rotor, respectively, said set having the core bodies facing to each other with said annular element of said rotor therebetween.

11. The rotation sensor according to claim 10, wherein said annular element includes two annular elements associated with the core bodies of said set, respectively.

12. The rotation sensor according to claim 10, wherein said rotor includes an inner ring portion to be mounted to the rotating member and an outer ring portion connected to the inner ring portion through bridges, the outer ring portion being formed as said annular element.

13. The rotation sensor according to claim 10, wherein said sensor comprises a plurality of sets each including said two magnetic coil/core units, said sets being arranged along the circumferential direction of said rotor.

14. The rotation sensor according to claim 8, wherein said plurality of magnetic coil/core units include a first magnetic coil/core unit which is located at a circumferential position of said rotor where said annular element has the minimum width, and a second magnetic coil/core unit which is located at a circumferential position of said rotor where said annular element has the maximum width when the rotating member is located at a neutral position, the first and second magnetic coil/core units being separated from each other in a diametrical direction of said rotor, and said detection device includes a first measurement section for measuring the rotation angle of said rotor, based on a difference between changes of the impedances of the exciting coils of the first and second magnetic coil/core units when the impedances of the exciting coils have changed.

15. The rotation sensor according to claim 14, wherein said plurality of magnetic coil/core units further include a third magnetic coil/core unit arranged at a substantially intermediate position between the first and second magnetic coil/core units in the circumferential direction of said rotor, and said detection device determines a rotating direction of the rotating member based on change in the impedance of the exciting coil of the third magnetic coil/core unit.

16. The rotation sensor according to claim 15, wherein said plurality of magnetic coil/core units further include a fourth magnetic coil/core unit separated from the third magnetic coil/core unit in a diametrical direction of said rotor, and said detection device further includes a second measurement section for measuring the rotation angle of said rotor, based on a difference between changes of the impedances of the exciting coils of the third and fourth magnetic coil/core units when the impedances of the exciting coils have changed, and a selecting section for selectively outputting the rotation angle measured by the first or second measurement section.

17. The rotation sensor according to claim 1, wherein the width of said annular element gradually increases along a circumference of said rotor such that said annular element has a minimum width and a maximum width at positions close to each other.

18. The rotation sensor according to claim 1, wherein the maximum width of said annular element is smaller than a diameter of the core body.

19. The rotation sensor according to claim 1, wherein the rotating member comprises a steering shaft for a motor vehicle, the steering shaft allowing torsional deformation thereof such that there is a relative rotation angle between opposite ends thereof, and said rotation sensor further comprises a sensing device for detecting the relative rotation angle of the steering shaft.

20. A method of detecting an angle of rotation of a rotating member, comprising the steps of: arranging a magnetic coil/core unit near a rotor rotatable together with the rotating member, the magnetic coil/core unit having a core body and an exciting coil for carrying an AC current and forming a magnetic circuit, said rotor having an annular element whose width varies along a circumferential direction of said rotor, said annular element causing impedance of the exciting coil to change in accordance with a rotation angle of the rotor; and measuring a rotation angle of the rotating member, based on change in the impedance of the exciting coil.

* * * * *